United States Patent
Philipson et al.

(10) Patent No.: US 10,269,515 B2
(45) Date of Patent: Apr. 23, 2019

(54) MAGNETIC ENCODER KNOB WITH FIXED CENTER

(71) Applicant: TOUCHSENSOR TECHNOLOGIES, LLC, Wheaton, IL (US)

(72) Inventors: Randall Philipson, Wheaton, IL (US); Randall A. Hornig, Wheaton, IL (US)

(73) Assignee: TOUCHSENSOR TECHNOLOGIES, LLC, Wheaton, IL (US)

( * ) Notice: Subject to any disclaimer, the term of this patent is extended or adjusted under 35 U.S.C. 154(b) by 113 days.

(21) Appl. No.: 15/689,470

(22) Filed: Aug. 29, 2017

(65) Prior Publication Data

US 2018/0066963 A1    Mar. 8, 2018

Related U.S. Application Data

(60) Provisional application No. 62/384,816, filed on Sep. 8, 2016.

(51) Int. Cl.
| | | |
|---|---|---|
| *H01H 36/00* | (2006.01) | |
| *H01H 25/06* | (2006.01) | |
| *G01D 5/14* | (2006.01) | |
| *G01D 5/245* | (2006.01) | |
| *G06F 3/0362* | (2013.01) | |

(52) U.S. Cl.
CPC .......... *H01H 36/00* (2013.01); *G01D 5/145* (2013.01); *G01D 5/2454* (2013.01); *G06F 3/0362* (2013.01); *H01H 25/06* (2013.01)

(58) Field of Classification Search
CPC .... G01D 5/145; G01D 5/2454; G06F 3/0362; H01H 36/00
USPC .................................................. 335/205–207
See application file for complete search history.

(56) References Cited

U.S. PATENT DOCUMENTS

| | | | | |
|---|---|---|---|---|
| 4,199,741 A | * | 4/1980 | Serrus Paulet ........ | H01H 36/00 335/206 |
| 2002/0067160 A1 | * | 6/2002 | Oomkes ................. | G01D 5/145 324/207.2 |
| 2007/0151322 A1 | * | 7/2007 | Steinich ................. | G01D 5/04 73/1.75 |
| 2009/0015244 A1 | * | 1/2009 | Zegula ................... | G01D 5/145 324/207.2 |
| 2011/0025311 A1 | * | 2/2011 | Chauvin ................ | G01D 5/145 324/207.25 |
| 2014/0260776 A1 | | 9/2014 | Burleson | |
| 2016/0209241 A1 | * | 7/2016 | Mitsuhashi ........... | G01D 5/145 |

FOREIGN PATENT DOCUMENTS

| | | |
|---|---|---|
| DE | 19906365 | 8/2000 |
| DE | 10-2006-028031 | 12/2007 |
| DE | 10-2011-002410 | 7/2012 |

OTHER PUBLICATIONS

Search Report & Written Opinion issued in App. No. PCT/US2017/049533 (dated 2017).

* cited by examiner

*Primary Examiner* — Mohamad A Musleh
(74) *Attorney, Agent, or Firm* — Barnes & Thornburg LLP

(57) ABSTRACT

A magnetic encoder knob system includes a knob associated with a first side of a substrate and a magnetic encoder associated with a second side of the substrate. First and second magnets are disposed in or on the knob such that magnetic flux lines extending between the first and second magnets pass through the encoder so that the encoder responds to rotation of the magnetic flux lines in response to rotation of the knob.

20 Claims, 3 Drawing Sheets

US 10,269,515 B2

MAGNETIC ENCODER KNOB WITH FIXED CENTER

CROSS-REFERENCE TO RELATED APPLICATION

This application claims benefit under 35 U.S.C. § 119 of U.S. Provisional Patent Application No. 62/384,816, filed on Sep. 8, 2016, and incorporates by reference the disclosure thereof in its entirety.

BACKGROUND AND SUMMARY OF THE DISCLOSURE

With reference to FIG. 1, a control system may include a control knob 12 associated with a panel or substrate 14, a magnet 16 fixedly disposed in the control knob for rotation with the knob, and a magnetic encoder 18 fixedly disposed on the panel or substrate or to a circuit carrier 20 attached to the panel or substrate. The control knob 12 has an axis of rotation A passing through the center of the knob. The magnet 16 and magnetic encoder 18 are disposed along or immediately adjacent the axis of rotation A.

The magnet 16 has north and south poles N, S, and it produces a magnetic field extending between the north and south poles. Magnetic flux lines F leave the magnet 16 from the north pole N and return to the magnet at the south pole S. The flux lines F pass through the encoder 18 generally perpendicular to the axis of rotation A. Because the magnet 16 is fixedly disposed in the knob 12, rotation of the knob results in rotation of the magnet. Rotation of the magnet 16 results in rotation of the magnetic field and the flux lines F about the axis of rotation A. The magnetic encoder 18 responds to rotation of the flux lines F passing there through by outputting a signal or signals that may be indicative of the direction, speed, and/or degree of rotation of the flux lines F passing there through and, therefore, indicative of the direction, speed, and/or degree of rotation of the knob 12.

Because the magnet 16 is disposed along or immediately adjacent the axis of rotation A, which passes through the center of the knob 12, it is impractical to provide a display at the center of the knob along the axis of rotation A. With reference to FIG. 2, attempts have been made to offset the magnet 16 from the center of the knob 12 to the perimeter of the knob, thereby making available space for a display proximate the center of the knob along the axis of rotation A. Locating the magnet 16 in this manner, distant from the axis of rotation and offset from the encoder, however, alters the orientation of the flux lines F through the encoder 18 in a manner that adversely affects the operation of the encoder.

DETAILED DESCRIPTION OF THE DRAWINGS

Figure 3:
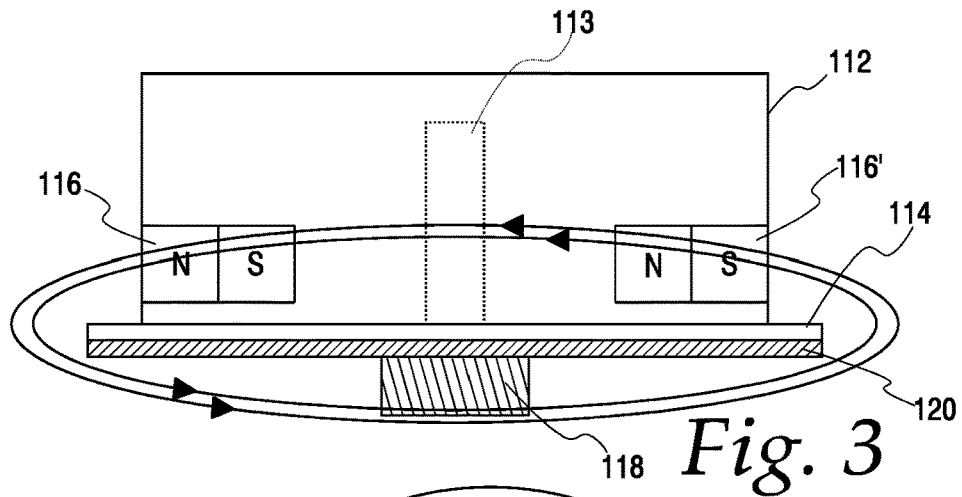
FIG. 3 shows an embodiment of a magnetic encoder knob system according to the present disclosure.

FIG. 3 shows a first illustrative embodiment of a magnetic encoder knob system 110 according to the present disclosure. The system 110 includes a control knob 112 rotatably associated with a first (or front) surface of a user interface panel or other substrate 114. The knob 112 is shown as right cylindrical and as having a top, a bottom, and a peripheral or circumferential edge surface. In other embodiments, the knob 112 could have other forms.

As shown, the knob 112 may be rotatably mounted on a shaft 113 extending from the first surface of the substrate 114. In other embodiments, the knob 112 could be rotatably associated with the substrate 114 in other ways.

A two-dimensional or three-dimensional magnetic encoder 118 is disposed on a circuit carrier 120, for example, a printed wiring board or flexible carrier, attached to a second (or rear) surface of the user interface panel 114. Alternatively, the magnetic encoder 118 could be disposed directly on the second surface of the panel 114. Either or both of the circuit carrier 120 and the panel also could carry other electrical components and circuits. The encoder 118 is generally aligned with the shaft 113. As such, the knob 112 is rotatably associated with the encoder 118.

Figure 3A:
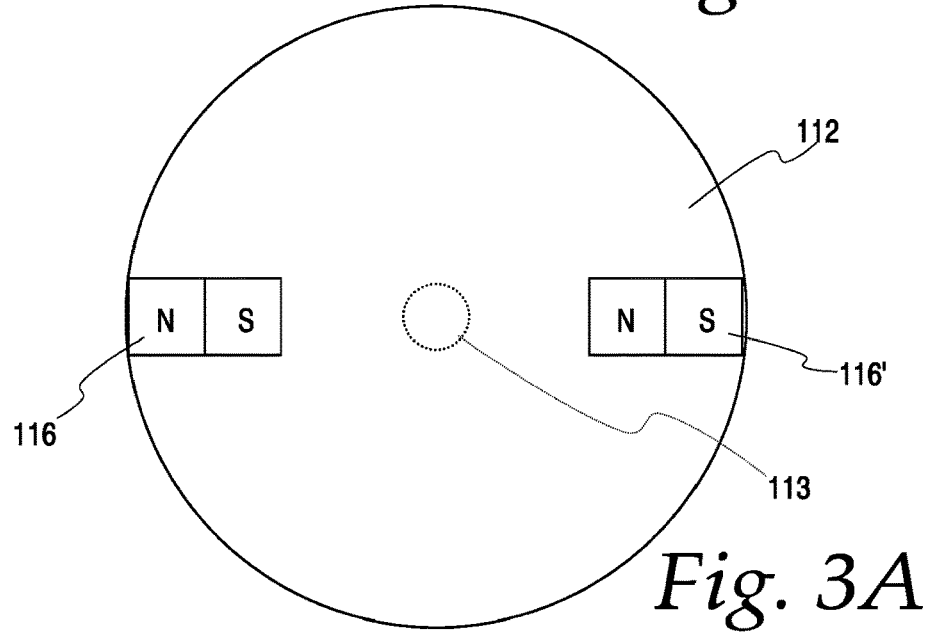
FIG. 3A is a top plan view of the magnetic encoder knob system of FIG. 3.

First and second magnets 116, 116' are disposed on or within the knob 112. As best shown in FIG. 3A, the first and second magnets 116, 116' are disposed near the peripheral edge of the knob 112, diametrically opposite each other. In other embodiments, the first and second magnets 116, 116' could be disposed away from the peripheral edge of the knob 112 and away from the center of the knob, generally diametrically opposite each other.

The first and second magnets 116, 116' are arranged with their respective magnetic axes collinear. That is, the magnetic axis of the first magnet 116 is collinear with the magnetic axis of the second magnet 116'. This arrangement of the first and second magnets 116, 116' results in the magnetic flux lines F emanating therefrom passing through the magnetic encoder 118 in a manner similar to the system shown in FIG. 1. As such, performance of the encoder 118 of the FIG. 3 embodiment when the knob 112 is rotated may be similar to performance of the encoder 18 of the FIG. 1 embodiment.

Figure 4:
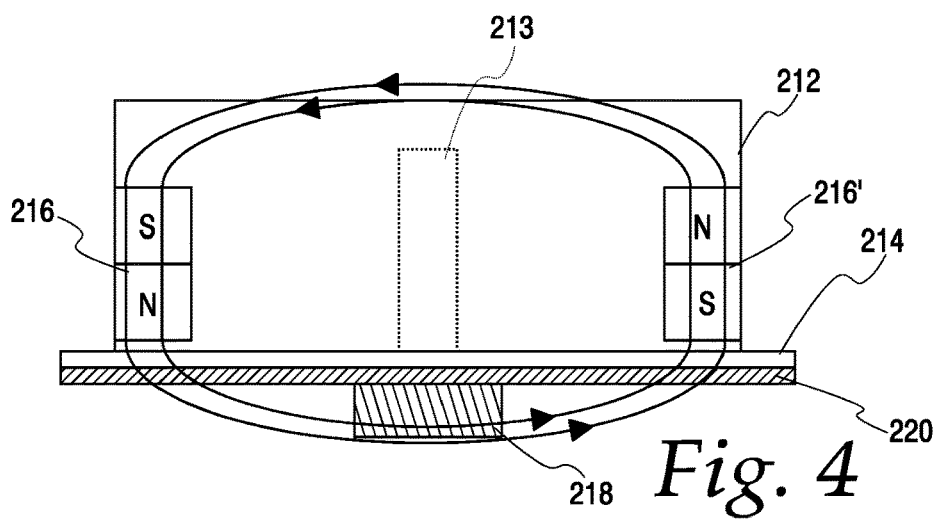
FIG. 4 shows another embodiment of a magnetic encoder knob system according to the present disclosure.

FIG. 4 shows a second illustrative embodiment of a magnetic encoder knob system 210 according to the present disclosure. The system 210 is identical to the system 110 except for the orientation of the first and second magnets 216, 216' in the knob 212. Whereas the first and second magnets 116, 116' are arranged in the knob 112 with their respective magnetic axes collinear, the first and second magnets 216, 216' are arranged in the knob 212 with their respective magnetic axes parallel to each other. This arrangement of the first and second magnets 216, 216' results in the magnetic flux lines F emanating therefrom passing through the magnetic encoder 218 in a manner similar to the systems shown in FIGS. 1 and 3. As such, performance of the encoder 218 of the FIG. 4 embodiment when the knob 212 is rotated may be similar to performance of the encoder 18 of the FIG. 1 embodiment.

Figure 5:
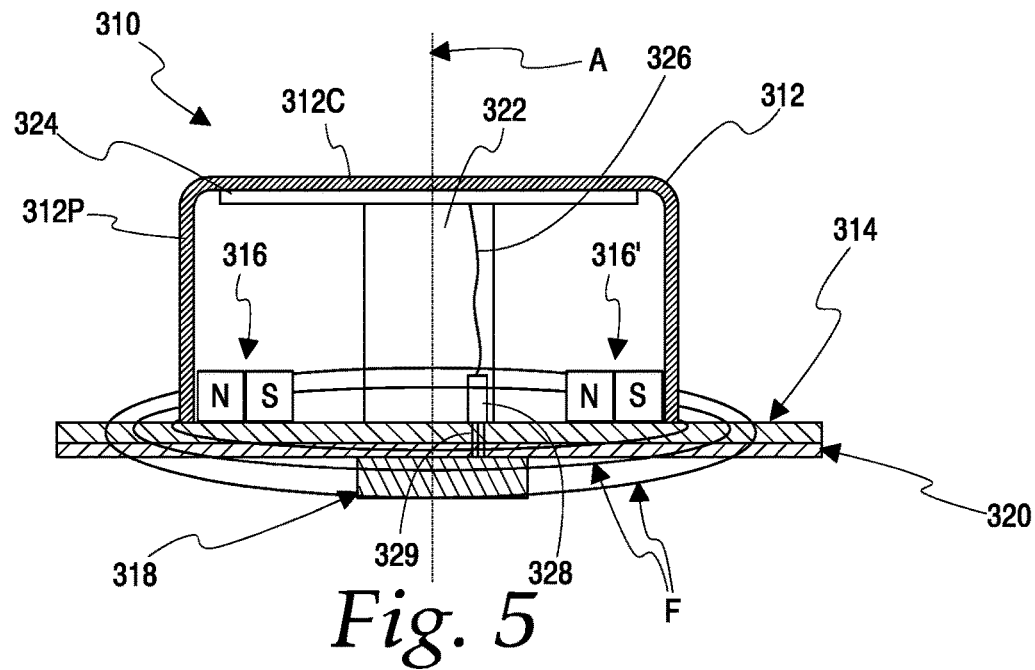
FIG. 5 shows yet another embodiment of a magnetic encoder knob system according to the present disclosure.
Figure 6:
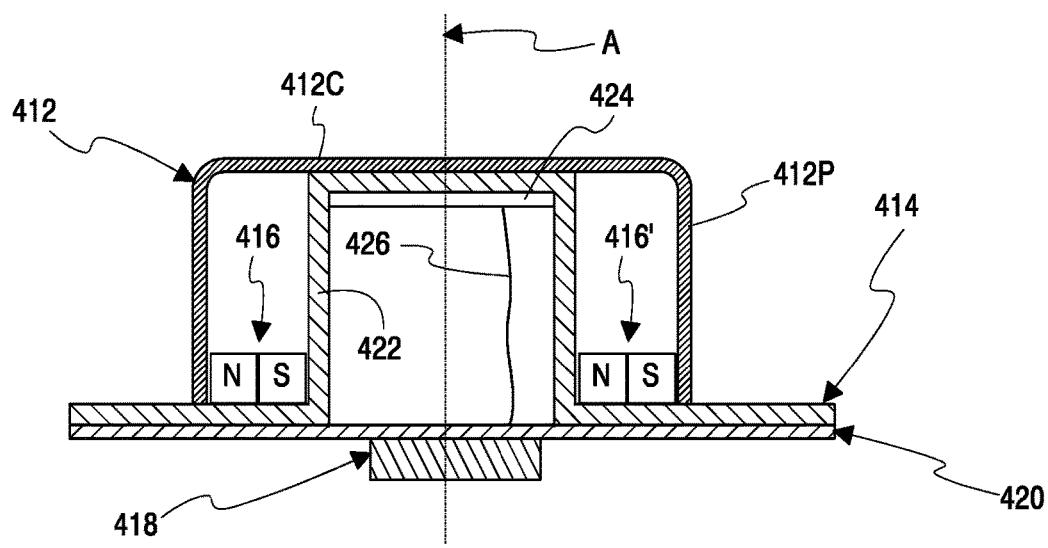
FIG. 6 shows still another embodiment of a magnetic encoder knob system according to the present disclosure.

FIGS. 5 and 6, respectively, show first and second applications 310, 410 of the knob system 110 discussed above, each having an arrangement of first and second magnets and an encoder similar to the arrangement of the first and second magnets 116, 116' and the encoder 118 of the system 110.

Each of the first and second applications 310, 410 could be modified to instead have an arrangement of first and second magnets and an encoder similar to the arrangement of the first and second magnets 216, 216' and the encoder 218 of the system 210 discussed above.

As suggested above, FIG. 5 shows a first application of a magnetic encoder knob system 310 according to the present disclosure. The system 310 includes a control knob 312 rotatably associated with a first (or front) surface of a user interface panel or other substrate 314. A two-dimensional or three-dimensional magnetic encoder 318 is disposed on a circuit carrier 320, for example, a printed wiring board or flexible carrier, attached to a second (or rear) surface of the user interface panel 314. Alternatively, the magnetic encoder 318 could be disposed directly on the second surface of the panel 314.

The knob 312 is rotatably disposed on a shaft 322 having a free end extending from a first (or front) surface of the panel 314. The shaft 322 may be embodied as a cylinder, an annulus, a light pipe, or another structure. The panel 314 is generally planar, and the shaft 322 is extends from the front surface of the panel. The panel 314 and shaft 322 could be formed as separate structures post-attached to each other or they could be monolithically formed.

A display 324, for example, an LED, LCD, or touch-screen, may be fixed to or otherwise provided at the free end of the shaft 322. A wire or wiring harness 326 may extend from the display 324 to the circuit carrier 320. As shown, the free end of the wiring harness 326 includes a connector 328 that may be attached to a mating connector 329 on the circuit carrier 320. In this embodiment, the panel 314 defines an aperture that receives at least one of the connector 326 and the mating connector. In an embodiment, the display could be a simple decoration or other structure that does not rotate with the knob 312.

The knob 312 includes an outer shell rotatable along an axis of rotation A with respect to the panel 314. The outer shell includes a peripheral portion 312P having an outer surface grippable by a user. The user may, for example, grip the surface of the peripheral portion 312P and thereby rotate the knob 312. The outer shell also includes a top portion or cap 312C. The cap cooperates with the peripheral portion 312P to define a dome. The cap 312C may be transparent or translucent to allow a user to view the display 324 there through. In an embodiment, the cap 312C may define an aperture exposing the display 324 to the user.

First and second magnets 316, 316', each having a north pole N and a south pole S, are disposed in the knob 312 proximate the peripheral portion 312P of the knob. The magnets 316, 316' may be located proximate a first end of the knob that is proximate the panel 314 when the knob is attached thereto. The first and second magnets 316, 316' are located at or about diametrically opposite portions of the knob 312, and they are oriented with their magnetic poles aligned in a manner similar to the first and second magnets 116, 116' of the FIG. 3 embodiment. That is, the south pole S of the first magnet 316 is aligned with the north pole N of the second magnet 316'. As such, magnetic flux lines F leave the north pole N of the second magnet 316', enter the south pole S of the first magnet 316, leave the north pole N of the first magnet 316, pass through the encoder 318 generally perpendicular to the axis of rotation A, and enter the south pole S of the second magnet 316'. Alternatively, the north pole N of the first magnet 316 could be aligned with the south pole S of the second magnet 316', and the flux lines would be reoriented accordingly. In any event, rotation of the knob 312 causes the flux lines to rotate through the encoder 318 in a manner similar to that discussed above in connection with the system 10 and with similar effect.

As suggested above, FIG. 6 shows a second application embodiment of a magnetic encoder knob system 410 according to the present disclosure. The system 410 includes a control knob 412 rotatably associated with a first (or front) surface of a user interface panel or other substrate 414. A two-dimensional or three-dimensional magnetic encoder 418 is disposed on a circuit carrier 420, for example, a printed wiring board or flexible carrier, attached to a second (or rear) surface of the user interface panel 314. Alternatively, the magnetic encoder 418 could be disposed directly on the second surface of the panel 414.

The knob 412 is rotatably disposed on a shaft 422 having a free end extending from a first (or front) surface of the panel 414. As shown, the shaft 522 is monolithically formed with the panel 414, and the shaft extends from a planar portion of the panel. This structure allows the display 424 to be mounted on the second side of the panel 414, facing the circuit carrier 420.

A display 424 may be fixed to or otherwise provided at the free end of the shaft 422. A wire or wiring harness 426 may extend from the display 424 to the circuit carrier 420. The free end of the wiring harness 426 may include a connector (not shown) that may be attached to a mating connector (not shown) on the circuit carrier 420. Because the display 424 and the circuit carrier 420 are on the same side of the substrate 414, the wiring harness 426 need not pass through the panel in order to connect to the circuit carrier. As such, the panel 414 need not be perforated proximate the knob 412, the shaft 422, or the display 424.

Figure 1:
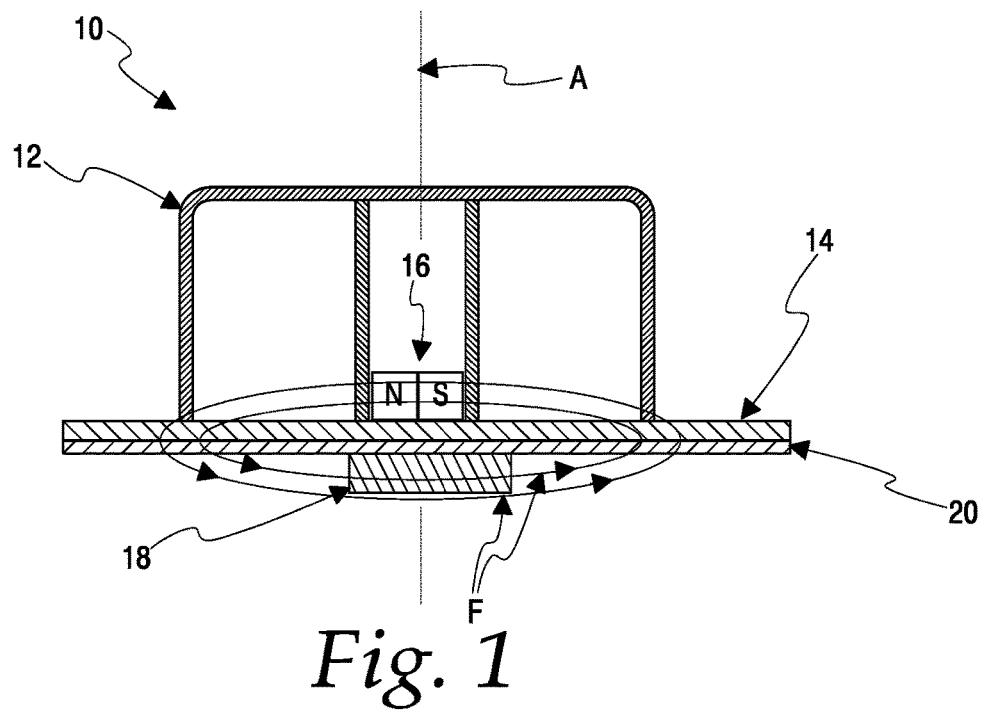
FIG. 1 shows a conventional magnetic encoder knob system.
Figure 2:
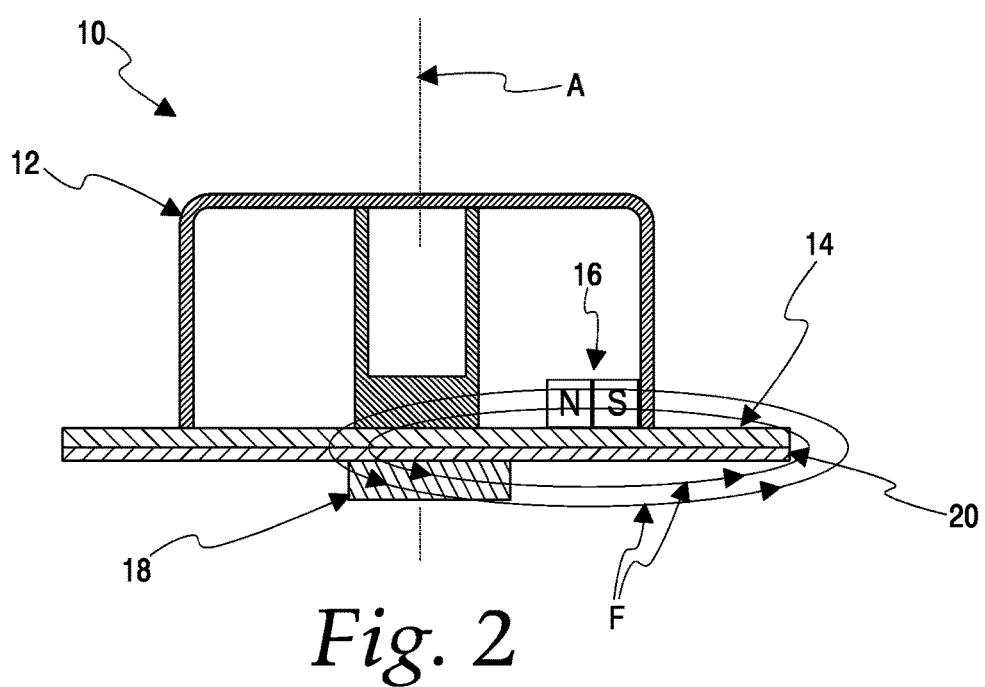
FIG. 2 shows an alternative magnetic encoder knob system.

First and second magnets 416, 416' are located and oriented so that the flux lines F pass through the encoder 418 in a manner substantially similar to that in which the flux lines F pass through the encoder 18 of the FIG. 1 embodiment. In this respect, the second application 410 may be similar or identical to the third application 310.

The embodiments shown and described herein are illustrative and not limiting. Features disclosed in connection with any embodiment may be incorporated into any other embodiment to the greatest extent possible. The scope of the invention is limited only by the appended claims.

The invention claimed is:
1. An apparatus comprising:
 a substrate having a first surface and a second surface;
 a knob rotatably associated with the first surface of the substrate, the knob having a peripheral surface and an axis of rotation;
 a first magnet attached to the knob spaced from the axis of rotation;
 a second magnet attached to the knob spaced from the axis of rotation and opposite the axis of rotation from the first magnet; and
 a magnetic encoder associated with the second surface of the substrate;
 wherein the first and second magnets are oriented so as to establish magnetic flux lines extending through the first magnet, the second magnet, and the encoder generally perpendicular to the axis of rotation;
 wherein the encoder responds to rotation of the magnetic flux lines; and
 wherein the portion of the substrate underlying the knob is imperforate.
2. The apparatus of claim 1 wherein the magnetic axis of the first magnet is collinear with the magnetic axis of the second magnet.

3. The apparatus of claim 1 wherein the north pole of the first magnet faces the south pole of the second magnet or wherein the south pole of the first magnet faces the north pole of the second magnet.

4. The apparatus of claim 1 wherein the magnetic axis of the first magnet is parallel to the magnetic axis of the second magnet.

5. The apparatus of claim 1 wherein one of the first magnet and the second magnet is attached to the knob proximate the peripheral surface of the knob.

6. The apparatus of claim 5 wherein the other of the first magnet and the second magnet is attached to the knob proximate the peripheral surface of the knob.

7. The apparatus of claim 1 further comprising a shaft extending from the first side of the substrate, the knob rotatably associated with the shaft.

8. The apparatus of claim 7 further comprising a display associated with a free end of the shaft.

9. The apparatus of claim 8 wherein the knob comprises a cap overlying the display, at least a portion of the cap being transparent or translucent, thereby enabling a user to view the display therethrough.

10. The apparatus of claim 8 wherein the knob comprises a cap, the cap defining an aperture enabling a user to view the display therethrough.

11. The apparatus of claim 7 wherein the shaft is integrally formed with the substrate.

12. The apparatus of claim 7 wherein the substrate is formed to define the shaft.

13. The apparatus of claim 12 further comprising a display associated with a free end of the shaft.

14. The apparatus of claim 13 wherein the knob comprises a cap overlying the display, at least a portion of the cap being transparent or translucent, thereby enabling a user to view the display therethrough.

15. The apparatus of claim 13 wherein the knob comprises a cap, the cap defining an aperture enabling a user to view the display therethrough.

16. The apparatus of claim 13 wherein the substrate is imperforate proximate the shaft.

17. The apparatus of claim 1 wherein the magnetic encoder is a two-dimensional magnetic encoder.

18. The apparatus of claim 1 wherein the magnetic encoder is a three-dimensional magnetic encoder.

19. The apparatus of claim 1 wherein the substrate bears no magnetic coupling element providing magnetic coupling between the first and second magnets and the encoder.

20. An apparatus comprising:
a substrate having a first surface and a second surface;
a knob rotatably associated with the first surface of the substrate, the knob having a peripheral surface and an axis of rotation;
a first magnet attached to the knob spaced from the axis of rotation;
a second magnet attached to the knob spaced from the axis of rotation and opposite the axis of rotation from the first magnet; and
a magnetic encoder associated with the second surface of the substrate;
wherein the first and second magnets are oriented so as to establish magnetic flux lines extending through the first magnet, the second magnet, and the encoder generally perpendicular to the axis of rotation;
wherein the encoder responds to rotation of the magnetic flux lines; and
wherein the substrate bears no magnetic coupling element providing magnetic coupling between the first and second magnets and the encoder.

* * * * *